(12) United States Patent
Wene et al.

(10) Patent No.: US 11,819,839 B2
(45) Date of Patent: *Nov. 21, 2023

(54) METHODS OF SULFURIZING METAL CONTAINING PARTICLES

(71) Applicant: CHEM32, LLC, Orange, TX (US)

(72) Inventors: Douglas G. Wene, Orange, TX (US); Soren Marklund, Orange, TX (US)

(73) Assignee: CHEM32, LLC, Orange, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,234

(22) Filed: Mar. 2, 2022

(65) Prior Publication Data
US 2022/0184575 A1 Jun. 16, 2022

Related U.S. Application Data

(60) Continuation of application No. 16/364,460, filed on Mar. 26, 2019, now Pat. No. 11,266,964, which is a
(Continued)

(51) Int. Cl.
| | |
|---|---|
| *B01J 8/02* | (2006.01) |
| *B01J 37/20* | (2006.01) |
| *B01J 23/72* | (2006.01) |
| *B01J 23/745* | (2006.01) |
| *B01J 20/30* | (2006.01) |
| *C01G 1/12* | (2006.01) |
| *C01G 3/12* | (2006.01) |
| *B01J 20/02* | (2006.01) |
| *B01J 23/40* | (2006.01) |

(Continued)

(52) U.S. Cl.
CPC ......... *B01J 8/0242* (2013.01); *B01J 20/0229* (2013.01); *B01J 20/0237* (2013.01); *B01J 20/0285* (2013.01); *B01J 20/3085* (2013.01); *B01J 23/72* (2013.01); *B01J 23/745* (2013.01); *B01J 37/20* (2013.01); *C01G 1/12* (2013.01); *C01G 3/12* (2013.01); *B01J 23/40* (2013.01); *B01J 23/48* (2013.01); *B01J 23/70* (2013.01); *B01J 2220/4806* (2013.01)

(58) Field of Classification Search
None
See application file for complete search history.

(56) References Cited

U.S. PATENT DOCUMENTS

| | | |
|---|---|---|
| 3,453,217 A | 7/1969 | Kozlowski et al. |
| 4,133,743 A | 1/1979 | Boret et al. |
| (Continued) | | |

FOREIGN PATENT DOCUMENTS

WO   WO 2013/136046    9/2013

*Primary Examiner* — Colin W. Slifka
(74) *Attorney, Agent, or Firm* — Norton Rose Fulbright US LLP

(57) ABSTRACT

Methods of sulfurizing metal containing particles in the absence of hydrogen are described. One method includes contacting a bed of metal containing particles with a gaseous stream comprising hydrogen sulfide and inert gas under reaction conditions sufficient to produce sulfided metal containing particles. The gaseous stream is introduced into a vertical reactor at an inlet positioned at the bottom portion of the reactor and any unreacted hydrogen sulfide and inert gas is removed at an outlet positioned above the inlet. The sulfided metal containing particles can be removed from the reactor and stored.

12 Claims, 2 Drawing Sheets

Related U.S. Application Data division of application No. 15/518,361, filed as application No. PCT/US2015/055656 on Oct. 15, 2015, now Pat. No. 10,286,373.

(60) Provisional application No. 62/064,697, filed on Oct. 16, 2014.

(51) Int. Cl.
    *B01J 23/48* (2006.01)
    *B01J 23/70* (2006.01)

(56) References Cited

U.S. PATENT DOCUMENTS

| | | |
|---|---|---|
| 4,210,519 A | 7/1980 | Boret et al. |
| 4,233,268 A | 11/1980 | Boret et al. |
| 4,530,917 A | 7/1985 | Berrebi |
| 4,719,195 A | 1/1988 | Toulhoat et al. |
| 6,100,216 A | 8/2000 | Dufresene et al. |
| 7,513,990 B2 | 4/2009 | Guillame et al. |
| 7,645,306 B2 | 1/2010 | Kanazirev |
| 8,088,705 B2 | 1/2012 | Dufresne et al. |
| 8,177,983 B2 | 5/2012 | Cousins et al. |
| 8,197,695 B2 | 6/2012 | Cousins et al. |
| 9,434,893 B2 | 9/2016 | Dufresne et al. |
| 2007/0032372 A1 | 2/2007 | Dufresne et al. |
| 2008/0312076 A1 | 12/2008 | Dufresne |
| 2011/0226700 A1 | 9/2011 | Hetherington et al. |
| 2012/0103912 A1 | 5/2012 | Hetherington et al. |
| 2013/0053234 A1 | 2/2013 | Fish et al. |

METHODS OF SULFURIZING METAL CONTAINING PARTICLES

CROSS REFERENCE TO RELATED APPLICATIONS

This application is a continuation application of U.S. application Ser. No. 16/364,460, filed Mar. 26, 2019, now U.S. Pat. No. 11,266,964, which is a divisional of U.S. application Ser. No. 15/518,361 filed Apr. 11, 2017, now U.S. Pat. No. 10,286,373, which is a national phase under 35 U.S.C. § 371 of International Application No. PCT/US2015/055656, filed Oct. 15, 2015, which claims the benefit of priority to U.S. Provisional Patent Application No. 62/064,697, filed Oct. 16, 2014, the entire contents of each application are hereby incorporated by reference in their entirety.

BACKGROUND OF THE INVENTION

A. Field of the Invention

The invention generally concerns the sulfiding of metals, more particularly, the sulfiding of metal containing particles in the absence of hydrogen.

B. Description of Related Art

Metals compounds are commonly used in new or regenerated absorbents and/or catalysts to remove undesirable metal materials (for example, heavy metals such as mercury) from gases and liquids that pass over the absorbent. The metals, however, upon preparation usually exist in a form that renders them inactive or of low activity. To increase the activity of the metals, the absorbents and/or catalysts are treated with sulfur or a sulfiding agent to convert the metals to the more active metal sulfides. This process can be referred to as sulfurating, sulfurization or sulfiding of metal catalysts, adsorbents, and absorbents. In conventional processes, sulfurization can be performed in-situ or ex-situ.

A common way to produce metal sulfides is to react a metal oxide with a gaseous sulfide, elemental sulfur, organic sulfur compounds that can decompose to hydrogen sulfide, or combinations thereof. Many of these processes are performed in the presence of hydrogen to promote full sulfurization of the metal oxide. In a conventional in-situ sulfurization of absorbents or catalysts that include metals, the sulfurization is performed in a reactor, where the absorbent or catalyst is used, or in the immediate vicinity of the reactor. For example, in the top of the reactor or zones that are more or less in direct communication with the reactor requiring the sulfurization to be performed under operating conditions (for example, temperature and pressure) that are imposed at least partially by the operating conditions of the reactor itself, or annexes of the reactor. In situ sulfurizing has the disadvantages of high costs, prolonged time for sulfurization and environmental pollution.

In a conventional ex-situ sulfurization process, the metal containing absorbent or catalyst can be treated with an inorganic or organic sulfur solvent in the presence of hydrogen. This occurs outside of the reactor and outside of the immediate vicinity of the reactor (e.g., separate room or location form the reactor). The sulfided material can then be treated with a passivating agent that can lessen the pyrophoric and/or self-heating nature of the sulfided material. The passivated sulfided metal material can then be transported to an absorption unit prior to starting the hydroprocessing or absorption reaction.

Many conventional processes treat the absorbent with a sulfurization agent, and then treat the resulting sulfided material with hydrogen to form metal sulfides. For example U.S. Pat. No. 8,197,695 to Cousins et al.; U.S. Pat. No. 8,177,983 to Cousins and U.S. Pat. No. 7,645,306 to Kanazirev describe processes that use absorbents that are sulfided during the process of removing heavy metals from a stream by passing a stream that contains the sulfiding agent and heavy metal over the absorbent.

U.S. Patent Application Publication No. 2013/0053234 to Fish et al. describes a method of preparing a sorbent that includes applying a layer of copper compound on the surface of the sorbent through dipping or spraying the support material with a slurry of basic carbonate. The coated support is dried and sulfided using conventional processes in an ex-situ vessel through which a sulfiding agent of hydrogen sulfide, alkali metal sulfide, ammonium sulfide, elemental sulfur or a polysulfide is passed. Hydrogen gas and carbon monoxide can be present when the sulfiding is performed at temperatures below 150° C. and particularly below 100° C.

U.S. Patent Application Publication No. 2012/0103912 to Hetherington et al. describes preparation of a sorbent for heavy metals that contain sulfides of vanadium, chromium, manganese, iron, cobalt or nickel. The sorbent is prepared by reducing a sorbent precursor containing a metal sulfide precursor compound of vanadium, chromium, manganese, iron, cobalt or nickel, and optionally a support or binder, to a lower oxidation state with a hydrogen containing gas to form a reduced composition, and sulfiding the reduced composition with a sulfiding compound to form the sorbent.

U.S. Patent Application Publication No. 2011/0226700 to Hetherington et al. describes preparation of sorbents that contain copper sulfides by sulfiding a sorbent precursor comprising a copper sulfide precursor compound and a binder and/or support material with a gas mixture comprising hydrogen sulfide to form a sulfided copper material, and reducing the sulfided copper material to a lower oxidation state to form the sorbent.

Conventional catalyst sulfiding processes are described in U.S. Pat. No. 6,100,216 to Dufresne et al. which describes a process for presulfurizing a hydrocarbon treatment catalyst and/or for preconditioning a catalyst, that includes one or two stages of incorporating sulfur into the pores of a hydrocarbon conversion catalyst conducted off-site in at least one moving zone that contains a catalyst with hydrogen and either hydrogen sulfide, sulfur, or a sulfur compound capable of evolving nascent hydrogen sulfide.

Some conventional processes require a protective material be applied to the metal sulfide catalyst after the sulfurization process. For example, U.S. Pat. No. 3,453,217 describes a method of preparing a hydrotreating catalyst and protecting the metal sulfides of the hydrotreating catalyst by introduction of a protective material into the pores of the catalyst.

International Patent Application Publication No. WO 2013/136046 to Cousins et al. describes a method for sulfiding copper sorbents. The method includes the steps of: (i) contacting a sorbent precursor material containing one or more sulfidable copper compounds, with a sulfiding gas stream comprising hydrogen sulfide to form a sulfided sulfur-containing sorbent material, and (ii) subjecting the sulfided sulfur-containing sorbent material to a heating step in which it is heated to a temperature above that used in the sulfiding step and >110° C., under an inert gas selected from nitrogen, argon, helium, carbon dioxide, methane, and mixtures thereof, said inert gas optionally comprising hydrogen sulfide.

While there are numerous ex situ methods of sulfurizing metal catalysts and sorbents they typically use hydrogen, excess amounts of sulfiding agents, and, in some cases, a passivating agent. Hydrogen is relatively expensive to make, separate, and/or procure, which makes the conventional processes expensive. Furthermore, when a sulfiding precursor is used, higher temperatures are required for the sulfurization process to decompose the sulfiding precursor to hydrogen sulfide. Many processes for ex situ sulfurization use multiple stages. Processing in multiple stages typically use mechanical means for moving and transporting the catalyst and sorbents, which can cause undesired physical abrasion and deterioration.

SUMMARY OF THE INVENTION

A solution to the problems associated with sulfurizing metal containing particles has been discovered. The solution resides in the ability to sulfide fragile metal containing particles in the absence of reducing agents, preferably in the absence of hydrogen, while providing hydrogen sulfide gas directly to the metal containing particles at a relatively low temperature. Reducing agents can include carbon monoxide and organic acids such as, for example, formic acid, methyl formate and ethyl formate. The present invention solves the problem of having to generate hydrogen sulfide in situ at high temperatures and the control the exothermic nature of the sulfiding process. The solution also resides in that little, or no, excess hydrogen sulfide is used in the process. Notably, it was discovered that the sulfurization can take place without movement of the particle bed, thus the metal containing particles are not damaged during the sulfurization process. The metal containing particles can be comprised in a sorbent or a catalyst. In some preferred aspects of the invention, the sulfided metal containing particles are used as a sorbent.

In one aspect of the present invention, a method of sulfurizing metal containing particles in the absence of hydrogen is described. The method includes (a) obtaining a vertical reactor comprising a bed of metal containing particles; (b) contacting the bed of metal containing particles with a gaseous stream comprising hydrogen sulfide and inert gas under reaction conditions sufficient to produce sulfided metal containing particles, and (c) removing sulfided metal containing particles from the reactor. The gaseous stream can be introduced into the vertical reactor at an inlet positioned at the bottom portion of the reactor and any unreacted hydrogen sulfide and inert gas is removed at an outlet positioned above the inlet. Contacting can be performed at pressure from ambient pressure to 195 kPa. Steps (a), (b), (c), or any combinations thereof are performed in the absence of hydrogen gas. In some aspects of the invention, the method can be performed off site. The metal containing particles in the reactor prior to contacting with hydrogen sulfide are particles that have not previously been sulfided, are particles that need to be re-sulfided, or are a combination thereof. In some instances, the metal containing particles prior to contacting with hydrogen sulfide are supported particles. The support can be a refractory oxide, carbon, titanium dioxide, or any combination thereof. In one instance, the metal containing particles are un-supported particles. The metal in the metal containing particles can be a metal or metal compound from Group VIII or Group IB of the Period Table. A non-limiting example of the Group VIII metal is iron (Fe). A non-limiting example of the Group IB metal is copper (Cu). The inert gas can include methane, nitrogen, carbon dioxide, or any combination thereof. In some instances, a molar ratio of the combination of nitrogen and carbon dioxide to hydrogen sulfide ranges from 5:1 to 50:1, with a ratio of 25:1 being preferred. In some instances, the gaseous stream comprises about 1 to 20 vol. % or 2 to 20 vol. % of hydrogen sulfide. During contacting, the metal containing particles remain substantially stationary. In some instances, a linear weight hourly space velocity (LHSV) of the gaseous stream is used such that no fluidization or ebullition of the bed occurs, but a majority of the metal containing particles are in motion during contacting. In an alternative aspect of the invention, the metal containing particles static are relative to each other, and thus, are not mixed during contacting. In some aspects of the invention, the metal containing particles are heated to 50 to 200° C. prior to and/or during contact with hydrogen sulfide. The contacting conditions can include temperature and pressure. A contacting temperature is 250° C. or less, 200° C. or less, 150° C. or less, 100° C. or less, or from about 20 to 250° C. The temperature during the process can be controlled by one or more heating elements alone or in combination with one or more cooling elements. During the contacting process, 10%, 20%, 30%, 40%, 50%, 80% or up to 90% the bed of metal containing particles is converted into the sulfided metal containing particles. In some instances, a majority of the produced sulfided metal containing particles are positioned closer to the inlet when compared to the outlet of the reactor. In some aspects of the invention, at least 1% and less than 50% of the produced sulfided metal containing particles are removed from the bottom portion of the reactor and additional metal containing particles are added to the bed. The method can further include discontinuing the addition of metal particles to the bed, contacting the metal particles remaining in the bed with the gaseous stream that includes hydrogen sulfide and inert gas to convert the remaining metal containing particles into the sulfided metal containing particles and removing any unreacted hydrogen sulfide and inert gas at an outlet positioned above the inlet and removing substantially all of the sulfided metal containing particle from the bottom portion of the reactor, wherein 90% or more of the removed metal containing particles are converted into the sulfided metal containing particles. Steps (a) through (c) of the process can be repeated for a desired amount of time. For example, 2, 3, 4, 5 or more cycles, or until a sufficient amount of sulfided particles are produced. In some instances, 50%, 60%, 70%, 80%, 90% or more of the metals in the metal containing particle are converted into metal sulfides. In some instances, steps (a), (b), or (c) or any combinations thereof are done in the absence of oxygen, water, or both to minimize the formation of elemental sulfur and/or oxidation of the sulfided metal containing particles. In preferred embodiments, at least step (b) is performed in the absence of oxygen, water, or both to minimize the formation of elemental sulfur and/or oxidation of the sulfide metal containing particles.

In another aspect of the invention, a method of sulfurizing metal containing particles can include (a) contacting a bed comprising metal containing particles with a gaseous stream comprising hydrogen sulfide at conditions sufficient to produce sulfided metal containing particles, and partially sulfided metal containing particles in the bed, (b) removing a portion of the sulfided metal containing particles from the bed; and (c) providing unsulfided metal containing particles to the bed upstream of the partially unsulfided metal particles. The gaseous stream can be introduced into the bottom portion of the bed and any unreacted hydrogen sulfide is removed through an outlet proximate an upper portion of the bed. Contacting can be performed at pressure from ambient pressure to 195 kPa. Steps (a), (b), (c) or any combinations thereof can be performed in the absence of hydrogen gas. The sulfided metal containing particles can be downstream of, or below, the partially sulfided metal containing particles. In some aspects of the invention at least at least 25%, 50%, 75% or 90% of the initial amount of metal containing particles are sulfided. In some aspects of the invention, unsulfided metal containing particles can be upstream or above the partially sulfided metal particles. Thus, the particle bed can have at least three layers of metal containing particles with the partially sulfided metal containing particles between the sulfided metal particles and the unsulfided metal containing particles. In some aspects of the invention, removal of sulfided metal containing particles and addition of unsulfided metal containing particles can be performed sequentially or simultaneously. In some aspects of the invention, a majority of the produced sulfided metal containing particles can be removed from the bottom portion of the particle bed. In a particular aspect, substantially all of the metal containing particles are removed from the bed, and 100% of the removed metal containing particles are sulfided. The gaseous stream can flow in an upwardly direction through the metal containing particles bed. In some embodiments, the bed is vertical (i.e., the height of the bed is greater than its width), and the gaseous stream flows from the bottom portion of the bed, through the bed, and then out the upper portion of the bed. The gaseous stream that exits the upper portion can include unused hydrogen sulfide, water, and, in some instances, inert gas. The metal in the particles and contacting conditions (e.g., temperature and pressure) can be the same as those described above and throughout the specification.

The terms "off-site" or "ex situ" refer to a location that is separate from the location where the metal containing particles are intended for use or not within a reactor where the metal containing particles are intended for use. For example, a location that is remote from a refining facility or natural gas facility, a vessel that is in the same building as the reactor but physically isolated from the reactor, or a vessel that is in a separate building from the reactor.

The term "mixed" means that the metal containing particles are moved by a force such that the particles position with respect to each other is randomized.

The terms "ebullition" or "fluidization" mean that the metal containing particles are suspended and kept in motion by an upward flow of a gas. For example, the metal containing particles move up and down and change position with respect to each other when contacted with an upward flow of a gas.

The terms "unsulfided metal containing particles" refer to unsulfided metal particles and metal particles that need to be re-sulfided.

The Periodic Table refers to the Chemical Abstracts Service version of Periodic Table.

The term "sorbent" includes adsorbents and absorbents.

The term "about" or "approximately" are defined as being close to as understood by one of ordinary skill in the art, and in one non-limiting embodiment the terms are defined to be within 10%, preferably within 5%, more preferably within 1%, and most preferably within 0.5%.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The methods of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the methods of the invention is the ability to sulfide metal containing particles off site under relatively low temperatures and in the absence of hydrogen.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

Figure 1C:
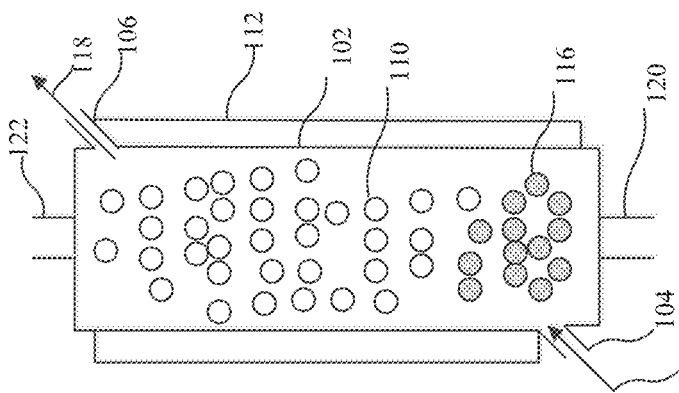
FIGS. 1A-1C are schematics of a method of the present invention for sulfurization of metal containing particles.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF THE INVENTION

A method to sulfide or re-sulfide metal containing particles using hydrogen sulfide in the absence of hydrogen at relatively mild and non-destructive conditions has been discovered. The discovery solves the problems of conventional processes, which typically provide the sulfurizing agent (1) to the top of the reactor, (2) under fluidizing or ebullition conditions, and/or at (3) high temperatures, which can lead to incomplete sulfurization of the particles and/or degradation of the metal compounds. The present invention does not require the particles to be mixed or moved during contact of the particles with gaseous hydrogen sulfide.

Without wishing to be bound by theory, it is believed that mixing or substantially moving the particles can damage the metal containing particles (for example, crush or break the particles), which may reduce the surface area of the particles, create increased pressure drop in the sorbent bed, and/or reduce the pore size of the particles such that incomplete sulfurization of the metals occurs. Notably, the invention provides a mild process for complete, or substantially complete, sulfurization of metals in the metal containing particles under static or non-fluidizing conditions.

These and other non-limiting aspects of the present invention are discussed in further detail with reference to the Figures.

The present invention provides a process for sulfurizing metal containing particles that have not been sulfided, particles that need to be re-sulfided or a combination thereof. The sulfurization is done in the absence of reducing agents or oxidizing agents, preferably in the absence of hydrogen gas, oxygen, water or any combination thereof, and most preferably in the absence of hydrogen gas. The metal containing particles can be supported or unsupported particles. The metals include one or more metals from Group VIII, Group IB of the Periodic Table, or any combination thereof. The metals can be of mixed valency, single valency, or both. Non-limiting examples of metals from Group VIII include iron (Fe), ruthenium (Ru), cobalt (Co), rhodium (Rh), nickel (Ni), palladium (Pd) and platinum (Pt), with Fe being preferred. Non-limiting examples of metals from Group IB include copper (Cu), gold (Au) and silver (Ag), with Cu being preferred. The metals can be in the form of an oxide (for example, iron oxide or copper oxide), hydroxide, carbonate, hydroxycarbonate or any mixture thereof. The metal containing particles can be any shape or size. In embodiments where the metal containing particles are in a shaped form, they can include a support, a binder or any combination thereof in addition to the metal. The shaped form can be a monolith, honeycomb or foam or shaped units such as pellets, extrudates or granules. Supports includes, refractory oxides, alumina, hydrated alumina, metal-aluminate, silica, titania, zirconia, zinc oxide, aluminosilicates, zeolites, metal carbonate, clay, cement, and carbon, or any mixture thereof. Binders that may be used to prepare the shaped units include clays, cements, calcium aluminate cements, and organic polymer binders such as cellulose binders, or any mixture thereof. The methods of the present invention of sulfurizing the metal containing particles according are illustrated with reference to FIGS. 1A-1C.

Figure 1B:
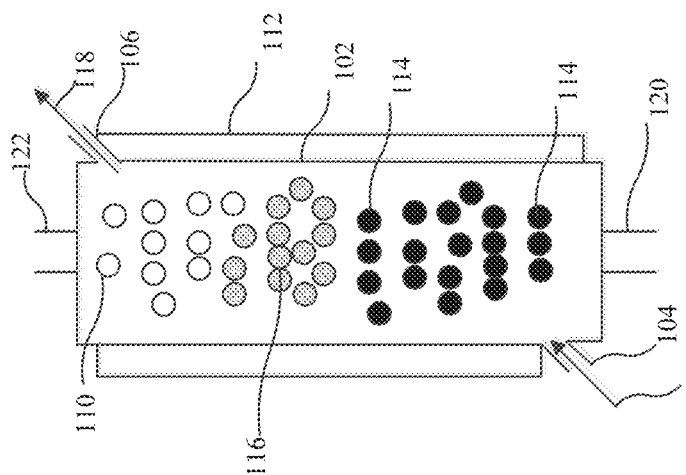
Figure 1A:
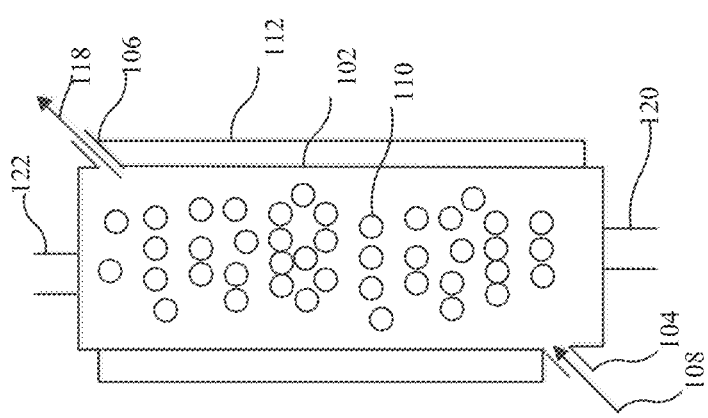

Treatment of metal containing particles in accordance with inventions described herein may include contacting a bed of metal containing particles with a gaseous stream comprising hydrogen sulfide and inert gas in a vertical reactor. In the reactor, at least a portion of the unsulfided metal containing particles can be sulfided in the absence of hydrogen by contact of the particles with a gaseous stream that includes hydrogen sulfide and inert gas. FIGS. 1A-1C are schematics of a contacting system 100 for sulfurizing metal containing particles in the absence of hydrogen in accordance with the methods of the present invention described throughout. Referring to FIG. 1A, the system 100 includes a vertical reactor 102. Vertical reactor has a height dimension greater than its width dimension. Vertical reactor 102 can include lower gas inlet 104 and gas outlet 106. The gas inlet 104 can be positioned at the bottom or proximate the bottom portion of the vertical reactor 102. The gas outlet 106 can be positioned at the top or upper portion of the vertical reactor 102. Unsulfided metal containing particles 110 and/or metal containing particles that need to be resulfided can be positioned in the reactor 102. The metal contain particles are layered in the reactor vessel in a random formation. In certain embodiments, a volume of metal particles in the reactor 102 is in a range from about 10-90 vol. %, about 20-50 vol. %, or about 30-40 vol. % of a total volume of the reactor. In some aspects of the invention, unsulfided particles 110 can be heated to a temperature of 50 to 200° C., 60 to 150° C., 70 to 130° C., or 80 to 100° C. prior to loading the reactor 102. In some aspects of the invention, particles 110 are heated in the reactor 102 using heating component 112. The heating component 112 can include a heating element, cooling element, be a shell or jacket that allows heat transfer fluid to circulate around the reactor 102, or inside coils internal to the reactor 102, or any combination thereof. In certain embodiments, the contacting system 100 is off site or ex situ to the system where the particles will be used. The gaseous stream 108 that includes hydrogen sulfide and inert gas enters the vertical reactor 102 through gas inlet 104. The gaseous stream 108 can have from 1 to 20 vol. %, 2 to 20 vol. %, 5 to 15 vol. %, or 6 to 12 vol. % of hydrogen sulfide. In some aspects of the invention, the amount of hydrogen sulfide is determined based on the molar amount of metal to be sulfided. The inert gas can include nitrogen, carbon dioxide, argon, methane, or any combination thereof. A molar ratio of the inert gas to hydrogen sulfide in the gaseous stream is at least 5:1, 10:1, 30:1 or 50:1. For example, the molar ratio of the combination of nitrogen and carbon dioxide to hydrogen sulfide can be at least 5:1, 20:1, or 50:1. Contact of hydrogen sulfide in the gas stream 108 with the unsulfided metal containing particles 110 can result in sulfided metal containing particles 114, partially sulfided metal particles 116, and unsulfided metal particles 110 as shown in FIG. 1B. In some aspects of the invention, 10%, 20%, 30%, 40%, 50%, 80%, or up to 90% of the bed of metal containing particles is converted into the sulfided metal containing particles 114. A majority of the produced sulfided metal containing particles 114 are positioned closer to the inlet 104 when compared to unsulfided metal containing particles 110 positioned closer to the outlet 106 of the reactor 102. Contact of the gaseous stream 108 results in spent gas stream 118. Spent gas stream 118 exits the reactor 102 through gas outlet 106. Spent gas stream 118 can include, water, inert gas, carbon dioxide, and some residual hydrogen sulfide. Water and/or carbon dioxide is formed due to the reaction of the hydrogen sulfide with the unsulfided metal. In some aspects of the invention, the spent gas stream contains little to no hydrogen sulfide gas.

Contacting conditions in the reactor 102 include, but are not limited to, temperature, pressure, gaseous stream flow, or any combination thereof. Contacting conditions in some embodiments are controlled to produce a specified amount of sulfided metal containing particles with certain amounts of sulfur. Temperature in the reactor 102 can be 250° C. or less, 200° C. or less, 150° C. or less, or 100° C. or less, or from 20 to 250° C. Temperature in the reactor 102 can be controlled by adjusting the setting of the heating and/or cooling elements or temperature of the fluid used in the heating component 112. Pressure in a contacting zone may range from about ambient to 195 kPa, 0.1 to 100 kPa, 1 to 20 kPa, or 5 to 10 kPa. The LHSV of the gaseous stream can depend on the shape and/or size of reactor and the metal containing particles, but can generally range from about 1-100 h$^{-1}$, about 5-50 h$^{-1}$, or about 10-30 h$^{-1}$. The LHSV of the gaseous stream 108 is such that no fluidization or ebullition of the metal containing particles 110 bed occurs, but a majority of the metal containing particles can vibrate or shake during contacting. In some embodiments, the metal containing particles 110 are substantially stationary during contact with the gaseous stream 108. In some aspects, of the invention the LHSV is controlled such that the metal containing particles 110 are not mixed. For example with reference to FIGS. 1A and 1B, the particles in the middle portion of the reactor 102 do not move to the lower portion of the reactor and the particles in the upper portion of the reactor 102 do not move to the middle portion of the reactor during contact with the gaseous stream 108.

Figure 2C:
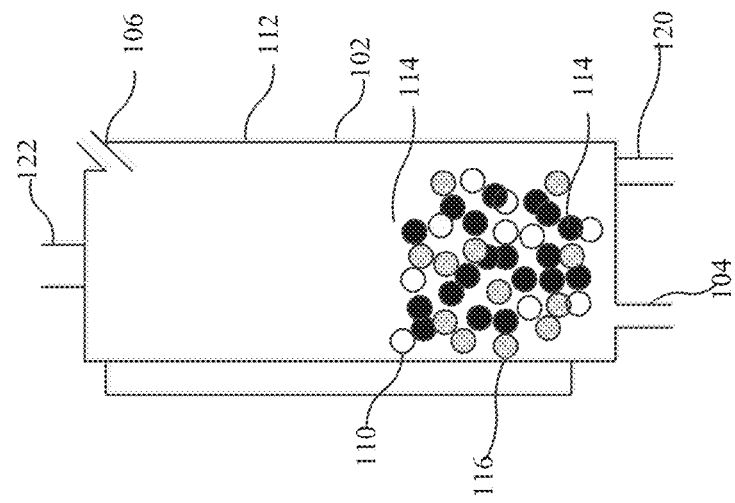
FIGS. 2A-2C are schematics of sulfurizing metal containing particles employing mixing methods.
Figure 2B:
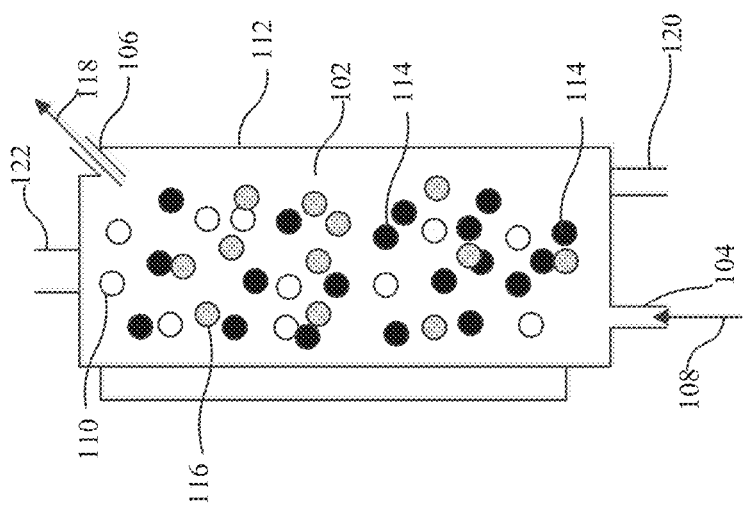
Figure 2A:
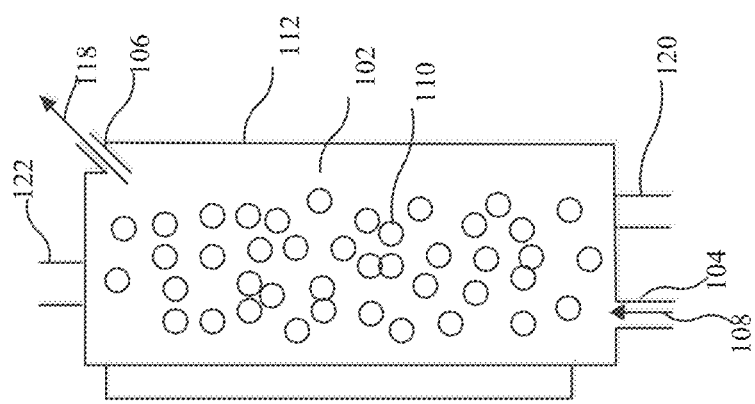

In contrast to the present invention, FIGS. 2A-2C are schematics of metal containing particles of sulfiding using mixing methods. As shown in FIG. 2A, as gaseous stream 108 is provided to the reactor 102, the unsulfided metal containing particles 110 to fluidized or ebullated in the reactor, which suspends and mixes the metal containing particles in the reactor 102. Thus, the metal containing particles are moved relative to each other. As the metal containing particles are sulfided, a mixture of sulfided, unsulfided particles, and partially sulfided particles is produced throughout the reactor 102, as shown in FIG. 2B. After the gaseous stream 108 is discontinued, the mixture of particles fall from the top of the reactor 102 to the bottom of the reactor as shown in FIG. 2C. Thus, when the metal containing particles are removed from the reactor after the sulfiding process, the metal containing particles are a mixture of sulfided, unsulfided and partially sulfided metal containing particles.

After a period of time, or until a desired amount of the metal containing particles 110 are sulfided, the flow of gas may be slowed or discontinued. For example, a known amount of hydrogen sulfide based on the metal content of the metal containing particles may be provided to the reactor. After the desired amount of hydrogen sulfide has been provided, the flow of hydrogen sulfide is discontinued and only inert gas is provided to the reactor. The gas exiting the reactor may be tested for hydrogen sulfide to determine that none, or substantially none, of the hydrogen sulfide is leaving the reactor. In some aspects of the invention, the reactor 102 may be flushed with an inert gas to remove any excess hydrogen sulfide gas to an acceptable level, typically less than 100 ppm. A portion, or all, of the sulfided metal containing particles 114 can then be removed via conduit 120 at the bottom of the reactor 102, and additional unsulfided metal containing particles 110 are added to the top portion of the reactor via conduit 122. The removal and addition of the particles 114 and 110 can be done simultaneously or in a stepwise manner. Removal of the sulfided metal particles 114, allows partially sulfided metal particles 116 to move to the bottom portion of the reactor 102, and the sulfiding process can be resumed as shown in FIG. 1C. Since, the metal containing particles are not suspended or substantially mixed in the reactor 102, the sulfided metal containing particles can be removed and have 5% or less, 1% or less, or no unsulfided or partially sulfided particles in the mixture. In some aspects of the invention, after the partially sulfided metal particles 116 have moved to the bottom portion of the reactor 102, no metal containing particles 110 are added to the top of the reactor. The sulfiding process is then resumed and the partially sulfided particles are sulfided and then removed from the reactor. The resulting sulfided metal particles 114 can be at least 99% or 100% sulfided. In some aspects of the invention, the system is automated and a hydrogen sulfide sensor is positioned in outlet 106 to monitor the amount of hydrogen sulfide leaving the reactor. Once the amount of hydrogen sulfide drops to a predetermined level or is undetected, the metal sulfided particles are removed from the reactor 102 via conduit 120.

The sulfided metal containing particles 114 can be packaged in containers under an inert (e.g., nitrogen or carbon dioxide) atmosphere. The sulfided metal containing particles 114 can be transported to another facility to be used in the manufacture of sorbents or catalysts or be used directly as sorbents or catalysts.

The system 100 can be automated with suitable sensors and/or thermocouples to acquire data during the process. The acquired data can be transmitted to one or more computer systems. The computer systems can include components such as CPUs or applications with an associated machine readable medium or article which may store an instruction or a set of instructions that, if executed by a machine, may cause the machine to perform a method and/or operations in accordance with the methods of the present invention. For example, upon input of data from the sensors and/or thermocouples, control the flow of the gaseous stream, opening or closing of valves associated with gas inlet 104, gas outlet 106, temperature element 112, reactor outlet 120 and reactor inlet 122. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The computer system may further include a display device such as monitor, an alphanumeric input device such as keyboard, and a directional input device such as mouse.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Sulfurization of Metal Containing Particles

Sorbent (6000 lbs.) containing 8% copper oxide precipitated on alumina was placed in a reactor having a length to diameter ratio of 6.0. The sorbent was preheated to 80° C. using a preheated inert stream of 40% carbon dioxide, 60% nitrogen and hot inert heating elements. Hydrogen sulfide was introduced to the inert gas stream at a ratio of 4 volume percent and the gaseous mixture as introduced at the bottom of the reactor at a LHSV of 45 h$^{-1}$. The concentration of hydrogen sulfide in the effluent gas was monitored. When the concentration in the effluent gas reached 500 ppm, the hydrogen sulfide addition was discontinued. When the level in the effluent gas reached 5 ppm, the flow of inert gases was reduced to a LHSV of 2 h$^{-1}$. A portion (1,000 lbs.) of sulfided sorbent was emptied from the bottom of the reactor and unsulfided sorbent (1,000 lbs.) was added to the top of the reactor, while being purged with inert gas. The sulfided sorbent was analyzed for sulfur using a LECO CS-230 analyzer and determined to have a 97% conversion of copper oxide to copper sulfide (CuS).

The invention claimed is:

1. A method of sulfurizing metal containing particles comprising:
   (a) contacting a bed comprising metal containing particles with a gaseous stream comprising hydrogen sulfide at conditions sufficient to produce sulfided metal containing particles and partially sulfided metal containing particles in the bed, wherein the gaseous stream is introduced into the bottom portion of the bed and any unreacted hydrogen sulfide is removed through an outlet proximate an upper portion of the bed; and
   (b) removing of the sulfided metal containing particles from the bed;
   wherein step (a) is performed at ambient pressure to 195 kPa;
   wherein steps (a) and/or (b) are performed in the absence of hydrogen gas; and
   wherein the metal containing particles remain substantially stationary during step (a).

2. The method of claim 1, wherein the method is performed off-site.

3. The method of claim 1, wherein the sulfided metal containing particles are positioned below the partially sulfided metal containing particles.

4. The method of claim 1, wherein at least 25% of the initial amount of metal containing particles are sulfided.

5. The method of claim 1, wherein a majority of the produced sulfided metal containing particles are removed from the bottom portion of the bed.

6. The method of claim 5, wherein substantially all of the sulfided metal containing particles are removed from the bed, and wherein 100% of the removed metal containing particles are sulfided.

7. The method of claim 1, wherein the gaseous stream further comprises an inert gas selected from nitrogen, argon, helium, methane, carbon dioxide, and mixtures thereof.

8. The method of claim 1, wherein the gaseous stream flows in an upwardly direction through the bed.

9. The method of claim 1, wherein the bed is vertical, and gaseous stream flows from the bottom portion of the reactor, through the bed, and then out the outlet.

10. The method of claim 9, wherein water and unused hydrogen sulfide are comprised in the gaseous stream removed through the outlet.

11. The method of claim 1, wherein contacting is performed at a temperature of 250° C. or less and a pressure from 101 kPa to 195 kPa.

12. The method of claim 1, wherein unsulfided metal containing particles are comprised in the bed after contact with the gaseous stream, and the unsulfided metal containing particles are positioned above the partially sulfided metal particles.

\* \* \* \* \*